United States Patent [19]

Grafton

[11] 3,946,150

[45] Mar. 23, 1976

[54] OPTICAL SCANNER

[75] Inventor: David Grafton, Santa Monica, Calif.

[73] Assignee: Xerox Corporation, Stamford, Conn.

[22] Filed: Dec. 20, 1973

[21] Appl. No.: 426,882

[52] U.S. Cl. .............................. 178/6.7 R; 178/7.6
[51] Int. Cl.² ............................................... H04N 1/22
[58] Field of Search .......... 178/7.6, 6.7 R; 350/225, 350/285

[56] References Cited
UNITED STATES PATENTS

| | | | |
|---|---|---|---|
| 2,932,236 | 4/1960 | Delano | 350/225 |
| 3,317,267 | 5/1967 | Offner | 350/225 |
| 3,750,189 | 7/1973 | Fleischer | 346/74 ES |
| 3,752,999 | 8/1973 | Sick | 178/7.6 |
| 3,804,976 | 4/1974 | Gard | 178/7.6 |
| 3,835,249 | 9/1974 | Dattilo | 178/7.6 |

*Primary Examiner*—Howard W. Britton
*Assistant Examiner*—Michael A. Masinick
*Attorney, Agent, or Firm*—John E. Beck; Terry J. Anderson; Irving Keschner

[57] ABSTRACT

A flux scanner which is comprised of a rotating polygon for scanning a beam of radiated flux transverse a photoreceptive medium. In the beam path between the flux source and the polygon, an astigmatic-beam expander lens is employed to focus the flux distributions to a spot at an image plane. The astigmatic lens is configured so as to produce a very narrow beam of flux to control the size of the spot in a direction orthogonal to the transverse direction, without any loss of efficiency. Between the photoreceptive medium and the polygon, a cylindrical lens and linear optical elements are positioned to focus the beam to control the size of the spot along the transverse direction. The transverse direction is designated optically as the tangential plane; whereas the direction orthogonal to the transverse direction is designated optically as the sagittal plane. These optical elements are configured to cause the sagittal and tangential planes of best focus to coincide at the image plane even though the object effectively emanates from two separate locations.

11 Claims, 4 Drawing Figures

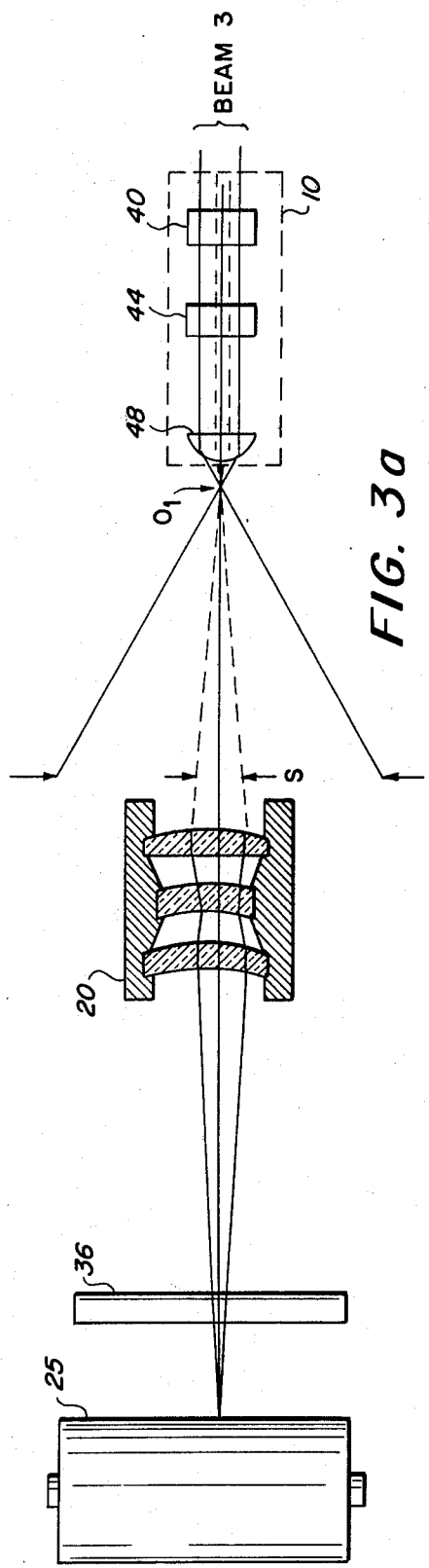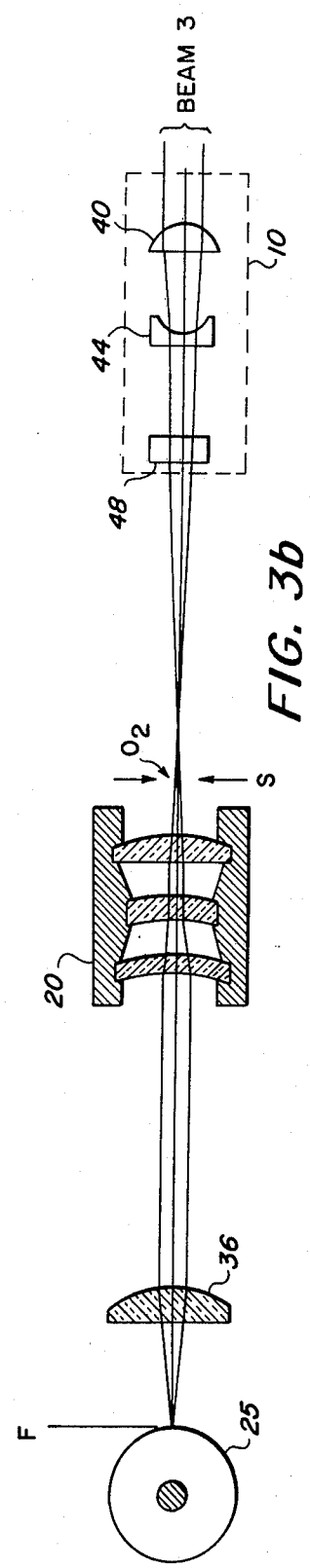

OPTICAL SCANNER

BACKGROUND OF THE INVENTION

This invention relates to a spot scanning system which utilizes a multifaceted rotating polygon for deflection of the scanning cycles depositing information upon recording media at video rates.

Much attention has been given to various optical approaches relating to spot scanning techniques which involve the imparting of information by means of modulating radiated flux incident upon recording media. Galvanometer driven movements have been used to scan the flux across a document for recording its information content thereon. Such arrangements have included planar reflecting mirrors which are driven in an oscillatory fashion. Other approaches have made use of multifaceted mirrors which are driven continuously. Various efforts have been made to define the spot size in order to provide for an optimum utilization of the scanning system.

One such effort is that described in U.S. Pat. No. 3,675,016. The approach used was to make the spot size invariant and as small as possible by defining the dimensions of the focused beam so that only part, preferably half, of a mirror facet is illuminated during scanning. This teaching alludes to generalized techniques for assuring the constancy of the size of the aperture of a rotating mirror scanning system. By either illuminating several facets of the mirror or by directing light in a beam that is sufficiently narrow to assure that less than a full facet is the most that can ever be illuminated by the beam and limiting scanning to that portion of the rotary travel of the facet when such facet is illuminated by all of such light beam. However, such system apertures are dimensionally invariant because the dimensions of the rotating facets have no influence on such apertures.

While the system as described in U.S. Pat. No. 3,675,016 may have advantages over the prior art, nevertheless, various constraints must be imposed upon the spot size and other relationships of optical elements within the system which are not always desirable.

In copending U.S. patent application, Ser. No. 309,874, filed on Nov. 27, 1972, and assigned to the assignee of the present invention, a spot scanning system is provided which does not have constraints imposed upon the spot size and other relationships of optical elements within the system which are not always desirable. As taught therein, a finite conjugate imaging system may be in convolution with the light beam and the rotating polygon. A doublet lens, in series with a convex imaging lens between the light source and the medium provides such an arrangement. Additionally, a cylindrical lens is positioned in the optical path between the polygon and the scanned medium to compensate for runout and polygon facet errors which may be undesirable.

It is thus an object of the present invention to further improve spot scanning systems which may tolerate substantial runout or facet errors.

It is a further object of the present invention to provide a spot scanning system which utilizes a multifaceted rotating polygon for achieving transverse spot deflection.

It is yet another object of the present invention to provide a spot scanning system which maintains an effective uniform spot size along the transverse scan direction and within a depth of focus normal to the recording medium.

It is still another object of the present invention to provide a spot scanning system which utilizes a rotating polygon for scanning a spot over a recording medium such that angular rotation of the polygon is linearly related to the transverse direction at the recording medium.

It is also an objective of the present invention to provide a flying spot scanning system which includes as its optical imaging elements a cylindrical lens in convolution with an astigmatic lens.

Other objects of the invention will be evident from the description hereinafter presented.

SUMMARY OF THE INVENTION

The invention provides a scanning system which employs a multifaceted rotating polygon as the element for directing a beam of radiated flux to focus to a spot upon a medium and for enabling the spot to traverse the medium throughout a scan width. A flux source, such as a laser, generates a beam of flux substantially orthogonal to the facets of the polygon which in turn reflect the impinging flux toward the medium in successive transverse scanning cycles. Additional optical elements are provided in convolution with the light source and the polygon to provide a desirable depth of focus of the spot and a sufficient resolution of the optical system.

Another feature of the invention is the inclusion of a cylindrical lens in the optical path between the polygon and the scanned medium. The flux reflected from the facets of the polygon impinge upon the convex surface of the cylindrical lens to focus at a predetermined position on the surface of the scanned medium regardless of runout and facet errors.

Yet another feature of the invention is the inclusion of an astigmatic anamorph lens in the optical path between the light source and the polygon, such lens comprising at least two cylindrical elements. One of the elements has no power in the tangential direction, and another has no power in the sagittal direction.

Still another feature of the invention is the modulation of the radiated flux by a signal which thereby imparts its information content to the beam of flux. The medium to be scanned is one which is responsive to the modulated beam and records its information content as contained within the scanning spot in a usable form on its surface across the scan width.

Yet another feature of the invention includes an embodiment of the spot scanning system for utilization in high speed xerography. The scanned medium in such an embodiment would consist of a xerographic drum which rotates consecutively through a charging station, an exposure station where the spot traverses the scan width of the drum causing the drum to become selectively discharged by the scanning spot, through a developing station, and a transfer station where a web of copy paper is passed in contact with the drum and receives an electrostatic discharge to induce the transfer of the developed image from the drum to the copy paper. A fusing device then fixes the images to the copy paper as it passes to an output station.

These and other features which are considered to be characteristic of this invention are set forth with particularity in the appended claims. The invention itself, however, as well as additional objects and advantages thereof, will best be understood in the following de-

DESCRIPTION OF THE DRAWINGS

FIG. 3(a) is a top perspective view of the utilization of the correction lenses in the tangential plane, which is an integral part of the scanning system shown in FIG. 1.

FIG. 3(b) is a side perspective view of the utilization of the correction lenses in the sagittal plane.

DESCRIPTION OF THE PREFERRED EMBODIMENT

Figure 1:
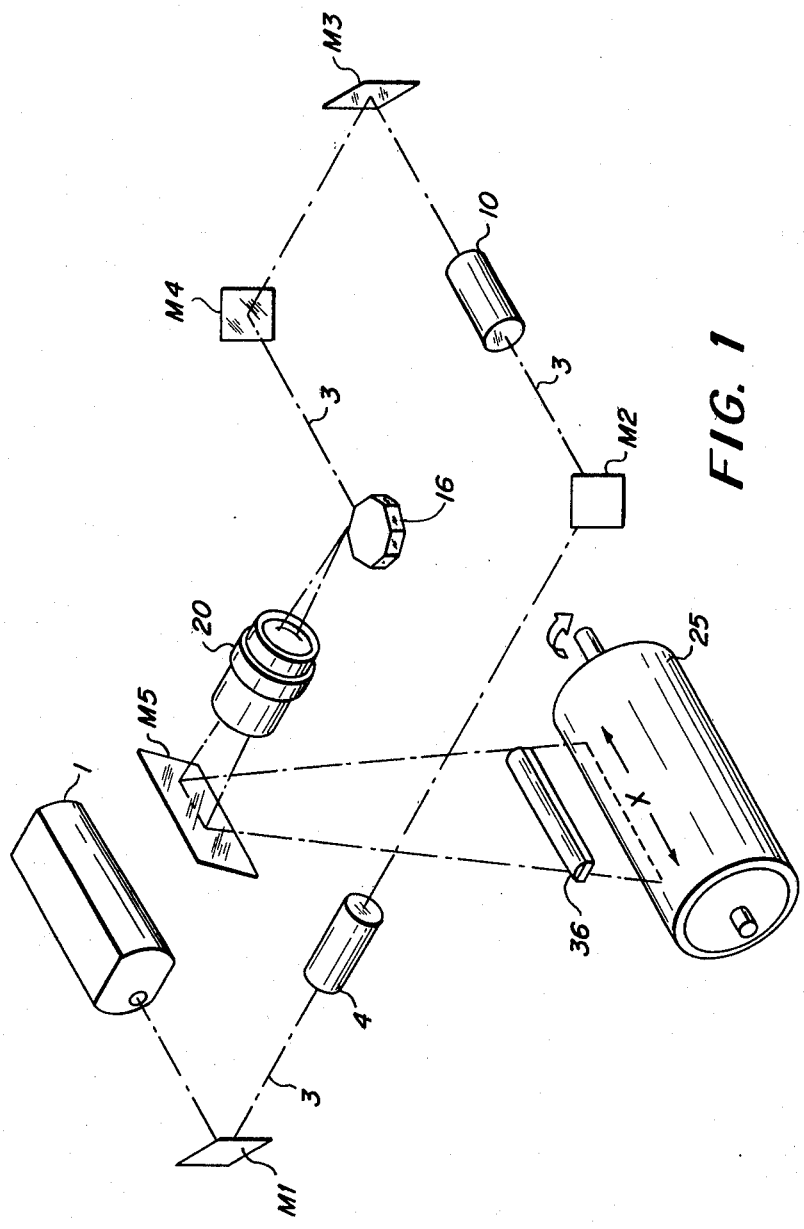
FIG. 1 is an isometric illustration of a scanning system in accordance with the invention.

In FIG. 1, an embodiment of a spot scanning system in accordance with the invention is shown. A flux source 1 provides the beam of flux for utilization by the scanning system. The flux source 1 is preferably a laser which generates a collimated beam 3 of monochromatic radiation which is reflected by a mirror M1 to be modulated by modulator 4 in conformance with the information contained in an electrical signal.

Modulator 4 may be any suitable electro-optical modulator for imparting the information to the beam 3. The modulator 4 may be, for example, a Pockel's cell comprising a potassium dihydrogen phosphate crystal, whose index of refraction is periodically varied by the application of the varying voltage which represents the electrical signal. The signal may contain information either by means of binary pulse code modulation or wideband frequency code modulation.

The beam 3 is reflected from a mirror M2 in convolution with an astigmatic lens configuration 10. The lens 10 is preferably comprised of three elements, which elements are in spaced relation to each other as shown in FIG. 3. Each of the elements are cylindrical lenses which provide a different function for the configuration 10, as to be described hereinafter. The configuration 10 focuses the beam 3 to a controlled energy distribution which is reflected from mirrors M3 and M4 to impinge upon one or more facets of a scanning polygon 16.

In the preferred embodiment, the rotational axis of polygon 16 is orthogonal to the plane in which light beam 3 travels. The facets of the polygon 16 are mirrored surfaces suitable for the reflection of any radiated flux impinging upon them. Alternatively, flying spot scanning could be provided by any other suitable device, such as mirrored piezoelectric crystals or planar reflecting mirrors which are driven in an oscillatory fashion.

Figure 2:
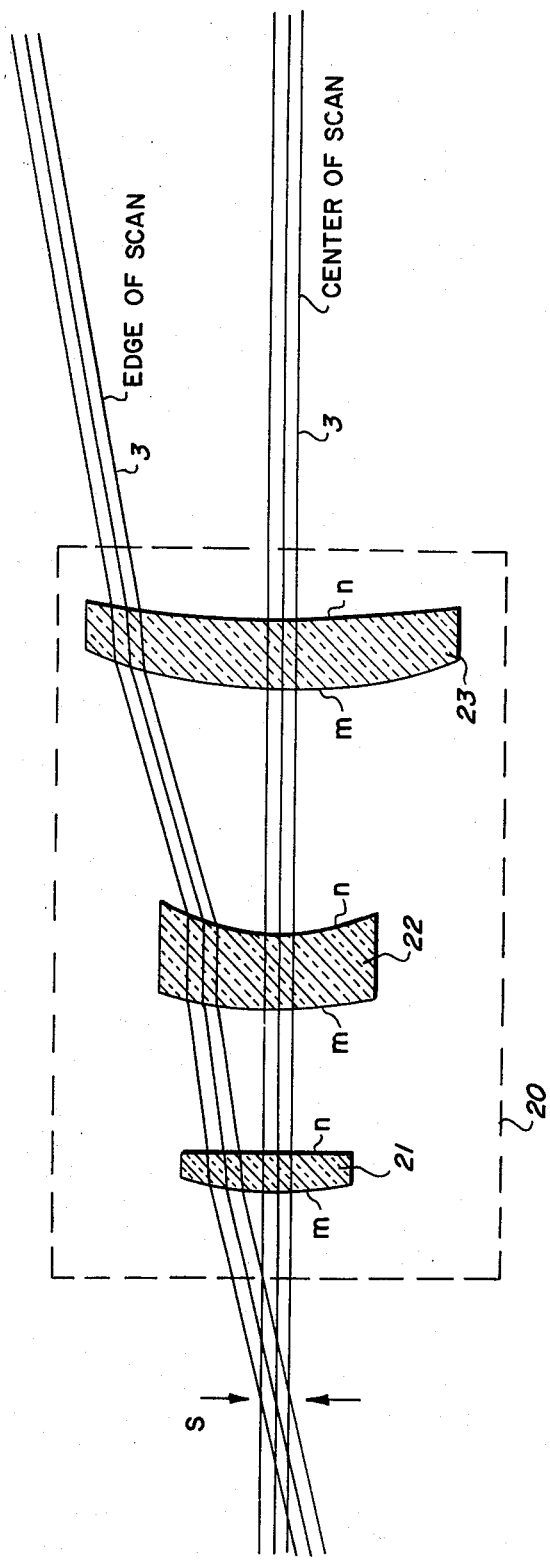
FIG. 2 is a schematic drawing of the triplet lens shown in FIG. 1 in either the tangential or sagittal plane.

At a distance from the leading illuminated facet of the polygon 16 is positioned an imaging lens 20. As shown, the lens 20 is located in the optical path between the polygon 16 and the medium 25. Alternatively, the lens 20 may be located between the polygon 16 and the lens 10 configuration 10. In this embodiment, the lens 20 is of a diameter to cooperate with the respective reflected light beams throughout each scan to focus them to a spot in a focal plane F proximate the surface a recording medium 25, after being reflected from a mirror M5. In the preferred embodiment, the imaging lens 20 is a triplet lens comprised of three air spaced optical elements 21, 22, and 23, as shown in FIG. 2.

For a scanning system where the scan length $x$ is 14 inches, the element 21 is a positive lens made of Schott BAK5 optical glass whose vertex is located 2.0 inches from a scanning facet defined by its plane S. The thickness of the element 21 is 0.49 inch. The element 22 is a negative lens made from Schott optical glass SF6 and has a thickness of 0.99 inch. The element 21 is separated 1.84 inches from the element 22. The element 23 is a positive lens made from Schott BK7 optical glass and has a thickness of 0.75 inch. The element 22 is separated from the element 23 by 3.122 inches. This combination of the optical elements 21, 22, and 23 is configured so that the effective focal length of the imaging lens 20 is 12.41 inches. The curvature of the optical elements 21, 22 and 23 are as follows:

| element surface | curvature |
|---|---|
| 21(m) | .1973 |
| 21(n) | 0.0 |
| 22(m) | .1858 |
| 22(n) | .3174 |
| 23(m) | .1478 |
| 23(n) | .0685 |

The surface of the recording medium 25 is located approximately 27.67 inches from surface 23($n$).

The triplet lens 20 is thus optimally designed to insure that it provides a linear relationship between the rotation of the polygon 16 and the deflection of the spot in the transverse direction at the recording medium 25. This linearization by optical means prevents barrel or pincushion-type distortion effects without the need for electrical compensation.

In order to compensate for runout errors and polygon facet errors, a cylindrical lens 36 is positioned in the optical path between the polygon and the scanned medium with its plane of no power in the tangential plane. The combination of lenses 20 and 36 as configured in FIG. 3(b) causes the facet plane S to be imaged at a plane of perfect motion compensation F. Small angular deviations of the beam introduced by mirror facet errors merely cause the rays to take a slightly different beam path via lenses 20 and 36; however, with respect to just the sagittal plane, lenses 20 and 36 always focus at the same point in the plane F. In this manner, at plane F perfect compensation of the image spot due to small facet mirror errors is achieved. The lens 36 may be either bi-convex, plano-convex, or meniscus.

A substantially uniform spot size is assured throughout a scan width $x$. The lens configuration 10 in convolution with the imaging lenses 20 and 36 provides an imaging system which combines the tangential focal plane (associated with the direction of scan) and the sagittal focal plane (associated with the direction perpendicular to the spot scan) with the plane of perfect motion compensation.

As shown in FIG. 3(a) (tangential plane) and (b) (sagittal plane), the lens configuration 10 is an astigmatic anamorph comprised of three air-spaced cylindrical elements 40, 44, and 48. The element 48 is a plano-convex cylinder lens with power active in only the tangential plane. The elements 44 and 40 are plano-concave, and plano-convex cylinder lenses, respectively, with power active in only the sagittal plane. The elements 40, 44, and 48 are all fabricated from spectacle crown glass.

As shown in FIG. 3(a), the element 48 produces one object point $O_1$ for the transverse scan direction which becomes imaged at the medium 25 via the triplet lens 20. The power of the element 48 is chosen so that it spreads the radiated flux over several facets of the polygon 16. The effective location and linear dimension of a single facet is designated by a facet plane S. in FIG. 3(a). The facet plane S restricts the effective fraction of the beam 3 utilized to the dotted line portion shown.

The elements 40 and 44 combine to produce an object point $O_2$ located at plane S in the sagittal configuration shown in FIG. 3(b). As previously described, the imaging lens 20 in combination with the cylinder lens 36 images this object point $O_2$ to a spot at the focal plane F coincident with the surface of the recording medium 25.

Thus, in the tangential direction, the first two elements of the anamorph configuration 10, lenses 40 and 44 have no power. The third lens 48 focuses the beam 6 at the object point $O_1$. In the sagittal direction the beam flux is converged by the lens 40, diverged by the negative lens element 44 just prior to coming to a focus, and becomes refocused by the no-power plane of the element 48 to the object point $O_2$ at the scanning facet of the polygon 16. The f/number of this converging cone at the scanning facet of the polygon 16 controls the sagittal dimension of the spot in the focal plane F.

The polygon 16 is continuously driven by a motor (not shown) and may be synchronized in rotation to a synchronization signal representative of the scan rate used to obtain the original video signal. In the case of the utilization of a xerographic drum, the rotation rate of the drum determines the spacing of the scan lines. The rotation of the polygon 16 off-axis from that desired causes runout errors or, in this case, a deflection of the scanned beam in the vertical direction away from the desired scan line. Assuming an angular deviation from the desired axis of rotation for the polygon 16, a runout angle defines the deflection from the intended direction of scan. Other misalignments of optical elements within the system, such as facet misalignment, also may cause the same runout effect. The positioning of the cylindrical lens 36 in the optical path, though, compensates for such effects, as has been discussed. Additional features of the lens 36 are discussed in copending U.S. patent application Ser. No. 309,874 already identified herein.

Medium 25 may be a xerographic drum (not shown) which rotates consecutively through a charging station depicted by corona discharge device, an exposure station where the beam from the rotating polygon 16 would traverse a scan width $x$ on the drum, through a developing station depicted by a cascade development enclosure, a transfer station where a web of copy paper is passed in contact with the drum and receives an electrostatic discharge to induce a transfer of the developed image from the drum to the copy paper. A fusing device fixes the images to the copy paper.

Usable images are provided in that the information content of the scanning spot is represented by the modulated or variant intensity of light respective to its position within the scan width $x$. As the spot traverses a charged surface through a given scan angle, the spot dissipates the electrostatic charge in accordance with its light intensity. The electrostatic charge pattern thus produced would be developed in the developing station and then transferred to the final copy paper. The xerographic drum would be cleaned by some cleaning device such as a rotating brush before being recharged by the charging device. In this manner, the information content of the scanned spot is recorded on a more permanent and useful medium. Of course, alternative prior art techniques may be employed to cooperate with a scanned spot in order to utilize the information contained therein.

Obviously, many modifications of the present invention are possible in light of the above teaching. It is therefore to be understood that, in the scope of the appended claims, the invention may be practiced other than as specifically described.

What is claimed is:

1. Apparatus for recording information onto a scanned medium comprising:
    laser means for generating a collimated beam of radiation,
    means for modulating the beam in accordance with the information content of an electrical signal,
    first optical means for imaging said modulated beam to a spot in a focal plane at the surface of said medium, said medium being sensitive to said radiation beam,
    scanning means positioned between said laser means and said medium for scanning the spot across said medium to impart the information content of said spot to said medium,
    second optical means positioned between said laser means and said scanning means for focusing said beam to a predetermined spot size, said second optical means comprising first and second cylindrical lens elements, said first cylindrical lens element being positioned with its power plane substantially orthogonal to the scan direction and said second cylindrical lens element being positioned with its power plane substantially parallel to the scan direction, and
    a cylindrical lens positioned in the optical path of the imaged beam between said first optical means and said medium with its power plane substantially orthogonal to the direction of scan whereby said beam is focused to maintain the spot in said focal plane.

2. The apparatus as defined in claim 1 wherein said second optical means further includes a third cylindrical lens element interposed between said first and second cylindrical lens elements with its power plane substantially orthogonal to the scan direction.

3. The apparatus as defined in claim 2 wherein said first and second cylindrical lens element are plano-convex and said third cylindrical lens element is plano-concave.

4. The apparatus as defined in claim 1 wherein said scanning means includes a multifaceted polygon having reflective facets for reflecting the modulated beam incident to it onto said medium and means for rotating said polygon such that the spot is scanned in successive traces across said medium.

5. The apparatus as defined in claim 4 wherein said first optical means comprises a plurality of lens elements selected such that a linear relationship between the angular position of the rotating polygon and the position of the scanning spot is provided.

6. The apparatus as defined in claim 5 wherein said plurality of lens elements comprise a first positive lens element, a second negative lens element and a third positive lens element.

7. Apparatus for recording information onto a scanned medium comprising:

laser means for generating a collimated beam of radiation, means for modulating the beam in accordance with the information content of an electrical signal, first optical means for imaging said modulated beam to a spot in a focal plane at the surface of said medium, said medium being sensitive to said radiation beam, said first optical means comprising a plurality of lens elements selected such that a linear relationship between the angular position of the rotating polygon and the position of the scanning spot is provided.

a rotating multifaceted polygon positioned between said laser means and said medium for scanning the spot across said medium in successive traces to impart the information content of said spot to said medium, second optical means positioned between said laser means and said scanning means for focusing said beam to a predetermined spot size, and a cylindrical lens positioned in the optical path of the imaged beam between said first optical means and said medium with its power plane substantially orthogonal to the direction of scan whereby said beam is focused to maintain the spot in said focal plane.

8. The apparatus as defined in claim 7 wherein said plurality of lens elements comprise a first positive lens element, a second negative lens element and a third positive lens element.

9. The apparatus as defined in claim 7 wherein said second optical means comprises:

first and second cylindrical lens elements, said first cylindrical lens element being positioned with its power plane substantially orthogonal to the scan direction and said second cylindrical lens element being positioned with its power plane substantially parallel to the scan direction.

10. The apparatus as defined in claim 9 wherein said second optical means further includes a third cylindrical lens element interposed between said first and second cylindrical lens elements with its power plane substantially orthogonal to the scan direction.

11. The apparatus as defined in claim 10 wherein said first and second cylindrical lens elements are plano-convex and said third cylindrical lens element is plano-concave.

* * * * *

UNITED STATES PATENT AND TRADEMARK OFFICE
CERTIFICATE OF CORRECTION

PATENT NO. : 3,946,150
DATED : March 23, 1976
INVENTOR(S) : David Grafton

It is certified that error appears in the above-identified patent and that said Letters Patent are hereby corrected as shown below:

Claim 7 should read as follows:

7. Apparatus for recording information onto a scanned medium comprising:
    laser means for generating a collimated beam of radiation,
    means for modulating the beam in accordance with the information content of an electrical signal,
    first optical means for imaging said modulated beam to a spot in a focal plane at the surface of said medium, said medium being sensitive to said radiation beam,
    a rotating multifaceted polygon positioned between said laser means and said medium for scanning the spot across said medium in successive traces to impart the information content of said spot to said medium,
    said first optical means comprising a plurality of lens elements selected such that a linear relationship between the angular position of the rotating polygon and the position of the scanning spot is provided,
    second optical means positioned between said laser means and said scanning means for focusing said beam to a predetermined spot size, and
    a cylindrical lens positioned in the optical path of the imaged beam between said first optical means and said medium with its power plane substantially orthogonal to the direction of scan whereby said beam is focused to maintain the spot in said focal plane.

Signed and Sealed this

Thirteenth Day of July 1976

[SEAL]

Attest:

RUTH C. MASON
*Attesting Officer*

C. MARSHALL DANN
*Commissioner of Patents and Trademarks*